(12) United States Patent
Gagne et al.

(10) Patent No.: US 10,908,267 B1
(45) Date of Patent: Feb. 2, 2021

(54) COAXIAL LOCAL OSCILLATOR GENERATION AT A CONJUGATE FOCAL PLANE IN AN FMCW LIDAR SYSTEM

(71) Applicant: AEVA, INC., Mountain View, CA (US)

(72) Inventors: Keith Gagne, Santa Clara, CA (US); Oguzhan Avci, Cupertino, CA (US); Behsan Behzadi, Sunnyvale, CA (US); Mina Rezk, Haymarket, VA (US); Kevin Pollock, Mountain View, CA (US); Pierre Hicks, Mountain View, CA (US); Gautam Prabhakar, Mountain View, CA (US)

(73) Assignee: AEVA, INC., Mountain View, CA (US)

( * ) Notice: Subject to any disclaimer, the term of this patent is extended or adjusted under 35 U.S.C. 154(b) by 0 days.

(21) Appl. No.: 17/031,515

(22) Filed: Sep. 24, 2020

(51) Int. Cl.
*G01S 3/08* (2006.01)
*G01S 7/4912* (2020.01)
*G01S 7/481* (2006.01)
*G01S 7/499* (2006.01)
*G01S 17/34* (2020.01)

(52) U.S. Cl.
CPC .......... *G01S 7/4917* (2013.01); *G01S 7/4817* (2013.01); *G01S 7/499* (2013.01); *G01S 17/34* (2020.01)

(58) Field of Classification Search
CPC .... G01S 7/4808; G01S 7/4811; G01S 7/4917; G01S 17/34
USPC ....................................................... 356/5.09
See application file for complete search history.

(56) References Cited

U.S. PATENT DOCUMENTS 4,594,000 A * 6/1986 Falk et al. .............. G01S 17/34
356/5.09
2006/0227316 A1* 10/2006 Gatt ............................ 356/5.09

* cited by examiner

*Primary Examiner* — Mark Hellner
(74) *Attorney, Agent, or Firm* — Womble Bond Dickinson (US) LLP

(57) ABSTRACT

A light detection and ranging (LIDAR) system includes an optical source to emit an optical beam, and free-space optics coupled with the optical source to focus the optical beam at a first focal plane, where a local oscillator (LO) signal is generated from a partial reflection of the optical beam from a partially-reflecting surface proximate to the first focal plane, and where a transmitted portion of the optical beam is directed toward a scanned target environment. The free-space optics configured to focus the LO signal and a target return signal at a second focal plane comprising a conjugate focal plane to the first focal plane. The system also includes a photodetector with a photosensitive surface proximate to the conjugate focal plane to mix the LO signal with the target return signal to generate target information.

17 Claims, 17 Drawing Sheets

COAXIAL LOCAL OSCILLATOR GENERATION AT A CONJUGATE FOCAL PLANE IN AN FMCW LIDAR SYSTEM

FIELD

The present disclosure is related to light detection and ranging (LIDAR) systems in general, and more particularly to the generation of a coaxial local oscillator (LO) signal at a conjugate focal plane with free-space optics.

BACKGROUND

Frequency-Modulated Continuous-Wave (FMCW) LIDAR systems use tunable lasers for frequency-chirped illumination of targets, and coherent receivers for detection of backscattered or reflected light from the targets that are combined with a local copy of the transmitted signal (LO signal). Mixing the LO signal with the return signal, delayed by the round-trip time to the target and back, generates a beat frequency at the receiver that is proportional to the distance to each target in the field of view of the system.

These LIDAR systems employ optical scanners with high-speed mirrors to scan a field of view (FOV) and to de-scan target return signals from the FOV. As mirror speeds are increased, mirror movement during the round trip time to and from a target can cause spatial misalignment between the LO signal and the target return signal, in turn, reduces the spatial mixing efficiency in the photodetectors that are used to mix the signals.

SUMMARY

The present disclosure describes various examples of LIDAR systems and methods for generating coaxial LO and target return signals for improved spatial mixing efficiency.

In one example, a LIDAR system according to the present disclosure includes an optical source to emit an optical beam and free-space optics coupled with the optical source to focus the optical beam at a first focal plane. A local oscillator (LO) signal is generated from a partial reflection of the optical beam from a partially-reflecting surface proximate to the first focal plane, and a transmitted portion of the optical beam is directed toward a scanned target environment. The free-space optics focus the LO signal and a target return signal at a second focal plane, which is a conjugate focal plane to the first focal plane. The system also includes a photodetector with a photosensitive surface proximate to the conjugate focal plane to mix the LO signal with the target return signal to generate target information.

In one example, the free-space optics include a polarization beam splitter (PBS) to transmit the optical beam to a first lens system, where the first lens system focuses the optical beam at the first focal plane. The free-space optics also include an optical window containing the partially reflecting surface where the LO signal is generated from the optical beam and reflected back through the first lens system.

In one example, the free-space optics include a second lens system, where the LO signal is directed through the second lens system by the PBS, and where the second lens system focuses the LO signal and the target return signal at the second focal plane.

In one example, the free-space optics include a third lens system to collimate the transmitted portion of the optical beam and an optical scanner to scan the target environment with the transmitted portion of the optical beam and to de-scan the target return signal. The third lens system focuses the target return signal at the first focal plane, the first lens system collimates the LO signal and the target return signal, and the PBS directs the LO signal and the target return signal to the second lens system.

In one example, the partially reflecting surface is displaced from the first focal plane.

In one example, the photodetector is displaced from the second focal plane.

In one example, a method in a LIDAR system according to the present disclosure includes focusing an optical beam at a first focal plane; generating a local oscillator (LO) signal by reflecting a portion of the optical beam from a partially reflecting surface proximate to the first focal plane, where a transmitted portion of the optical beam is directed toward a scanned target environment; focusing the LO signal and a target return signal at a second focal plane conjugate to the first focal plane; and mixing the LO signal with the target return signal in a photodetector proximate to the second focal plane to generate target information.

In one example, the method includes generating the optical beam with a coherent optical source; transmitting the optical beam through a polarization beam splitter (PBS) and through a first lens system to focus the optical beam at the first focal plane and through an optical window containing the partially reflecting surface, where the LO signal is reflected back through the first lens system.

In one example, the method includes reflecting the LO signal and the target return signal from the PBS through a second lens system, where the LO signal and the target return signal are focused at the second focal point.

In one example, the method includes collimating the transmitted portion of the optical beam with a third lens system, scanning the target environment with the transmitted portion of the optical beam, de-scanning the target return signal, and focusing the target return signal at the first focal plane with the third lens system.

In one example, the method includes collimating the LO signal and the target return signal with the first lens system and directing the LO signal and the target return signal to the second lens system with the PBS, where the LO signal and the target return signal are focused at the second focal plane.

In one example of the method, the partially reflecting surface of the optical window is displaced from the first focal plane.

In one example of the method, the photodetector is displaced from the second focal plane.

In one example, a LIDAR system according to the present disclosure includes a processor and a non-transitory computer-readable medium storing instructions, that when executed by the processor, cause the LIDAR system to perform operations, the operations including focusing an optical beam at a first focal plane; generating a local oscillator (LO) signal by reflecting a portion of the optical beam from a partially reflecting surface proximate to the first focal plane, where a transmitted portion of the optical beam is directed toward a scanned target environment; focusing the LO signal and a target return signal at a second focal plane conjugate to the first focal plane; and mixing the LO signal with the target return signal in a photodetector proximate to the second focal plane to generate target information.

In one example, the operations also include generating the optical beam with a coherent optical source and transmitting the optical beam through a polarization beam splitter (PBS) and through a first lens system to focus the optical beam at the first focal plane, and through an optical window including the partially reflecting surface, where the LO signal is reflected back through the first lens system.

In one example, the operations also include reflecting the LO signal and the target return signal from the PBS through a second lens system, where the LO signal and the target return signal are focused at the second focal point.

In one example, the operations also include collimating the transmitted portion of the optical beam with a third lens system; scanning the target environment with the transmitted portion of the optical beam; de-scanning the target return signal; and focusing the target return signal at the first focal plane with the third lens system.

In one example, the operations also include collimating the LO signal and the target return signal with the first lens system and directing the LO signal and the target return signal to the second lens system with the PBS, where the LO signal and the target return signal are focused at the second focal plane.

In one example, the partially reflecting surface of the optical window is displaced from the first focal plane.

In one example, the photodetector is displaced from the second focal plane.

BRIEF DESCRIPTION OF THE DRAWINGS

For a more complete understanding of the various examples, reference is now made to the following detailed description taken in connection with the accompanying drawings in which like identifiers correspond to like elements.

DETAILED DESCRIPTION

The present disclosure describes various examples of LIDAR systems and methods for detecting and mitigating the effects of obstructions on LIDAR windows. According to some embodiments, the described LIDAR system may be implemented in any sensing market, such as, but not limited to, transportation, manufacturing, metrology, medical, and security systems. According to some embodiments, the described LIDAR system is implemented as part of a front-end of frequency modulated continuous-wave (FMCW) device that assists with spatial awareness for automated driver assist systems, or self-driving vehicles.

Figure 1:
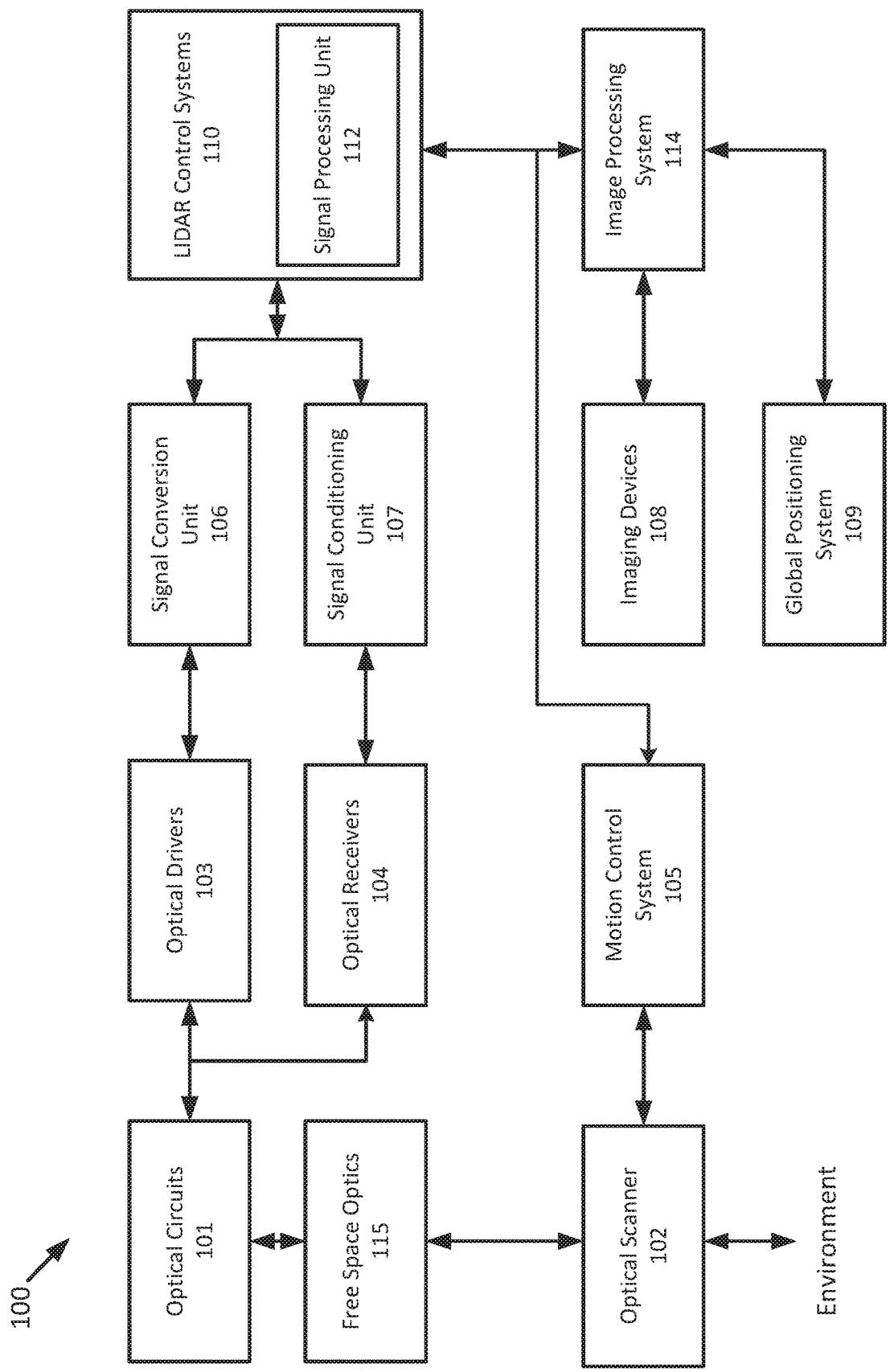
FIG. 1 illustrates an example FMCW LIDAR system according to embodiments of the present disclosure.

FIG. 1 illustrates a LIDAR system 100 according to example implementations of the present disclosure. The LIDAR system 100 includes one or more of each of a number of components, but may include fewer or additional components than shown in FIG. 1. As shown, the LIDAR system 100 includes optical circuits 101 implemented on a photonics chip. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. The optical scanner 102 also collects light incident upon any objects in the environment into a return optical beam that is returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processing device for the LIDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LIDAR control systems 110 may include a signal processing unit 112 such as a digital signal processor (DSP). The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning by signal conditioning unit 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LIDAR control systems 110. The LIDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate or a non-reciprocal polarization rotator such as Faraday rotator. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LIDAR control systems 110. A signal processing unit 112 may then receive the digital signals and interpret them. In some embodiments, the signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 2:
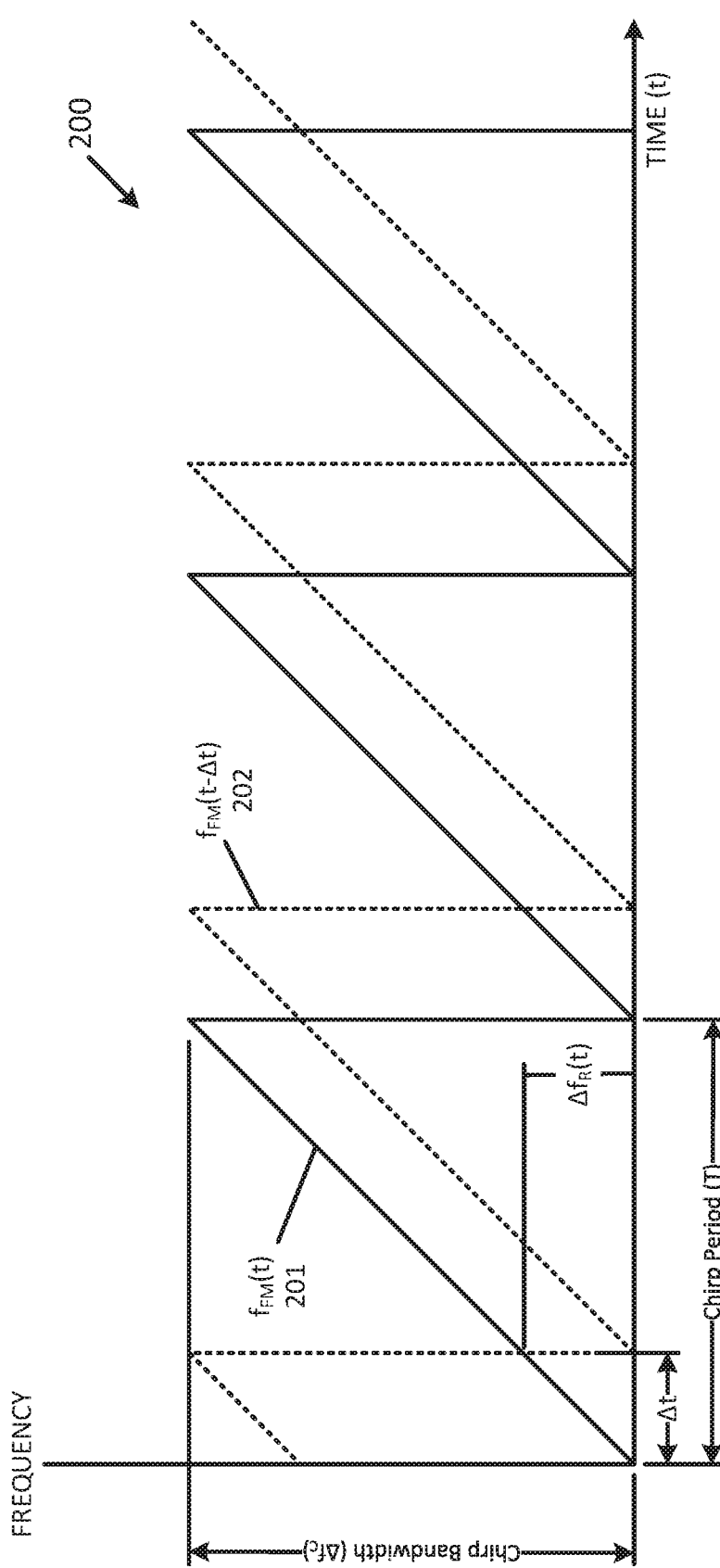
FIG. 2 is a time-frequency diagram illustrating an example of FMCW LIDAR waveforms according to embodiments of the present disclosure.

FIG. 2 is a time-frequency diagram 200 of an FMCW scanning signal 201 that can be used by a LIDAR system, such as system 100, to scan a target environment according to some embodiments. In one example, the scanning waveform 201, labeled as $f_{FM}(t)$, is a sawtooth waveform (sawtooth "chirp") with a chirp bandwidth $\Delta f_C$ and a chirp period $T_C$. The slope of the sawtooth is given as $k=(\Delta f_C/T_C)$. FIG. 2 also depicts target return signal 202 according to some embodiments. Target return signal 202, labeled as $f_{FM}(t-\Delta t)$, is a time-delayed version of the scanning signal 201, where $\Delta t$ is the round trip time to and from a target illuminated by scanning signal 201. The round trip time is given as $\Delta t=2R/v$, where R is the target range and v is the velocity of the optical beam, which is the speed of light c. The target range, R, can therefore be calculated as $R=c(\Delta t/2)$. When the return signal 202 is optically mixed with the scanning signal, a range dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 202 will, in general, also include a frequency offset (Doppler shift) if the target has a velocity relative to the LIDAR system 100. The Doppler shift can be determined separately, and used to correct the frequency of the return signal, so the Doppler shift is not shown in FIG. 2 for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta f_{Rmax}$) is 500 megahertz. This limit in turn determines the maximum range of the system as $R_{max}=(c/2)(\Delta f_{Rmax}/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

Figure 3:
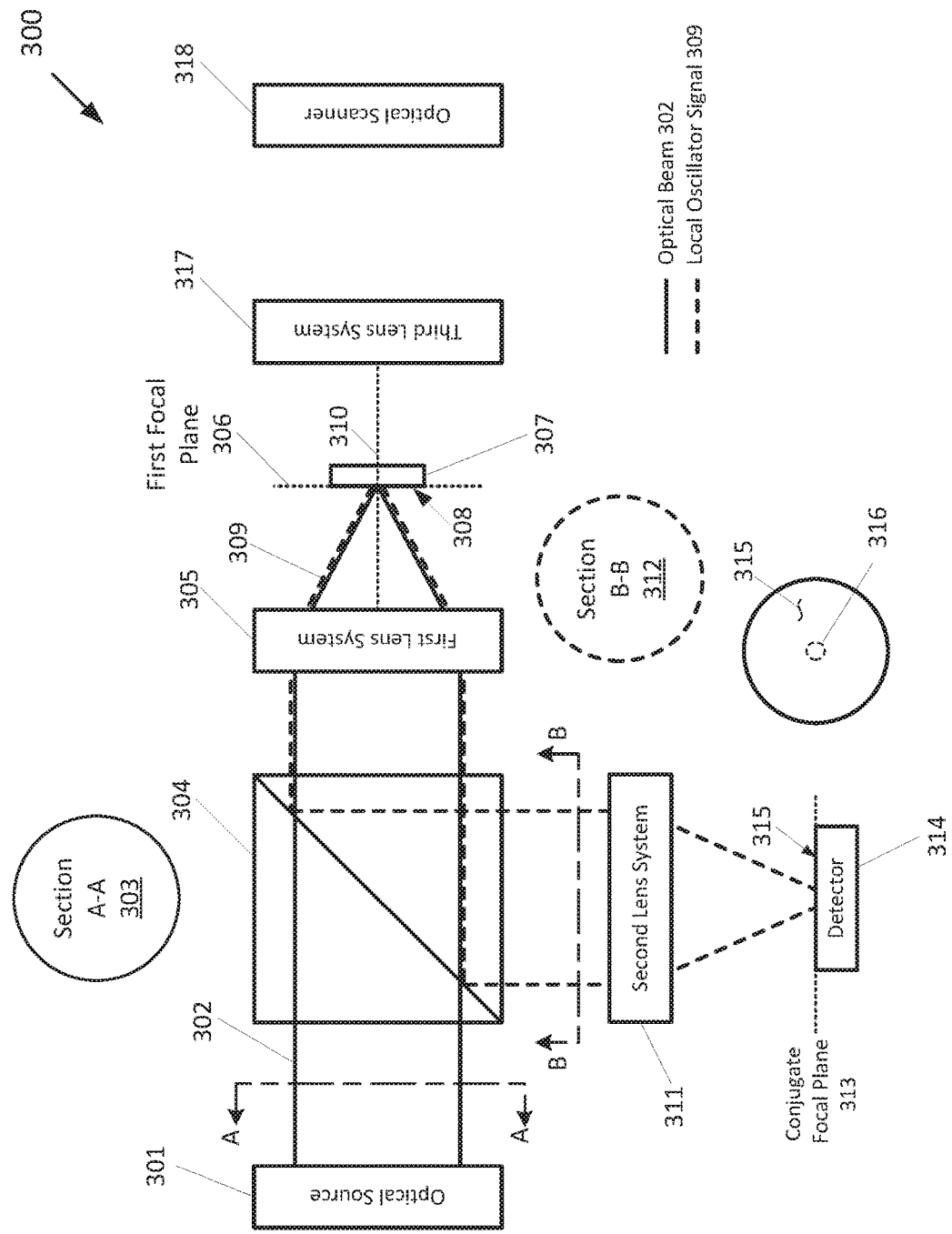
FIG. 3 is a block diagram of an example optical system according to embodiments of the present disclosure.

FIG. 3 illustrates a two-dimensional representation of a system of optical components 300 according to various aspects of the present disclosure. System 300 may include one or more components of optical circuits 101, free-space optics 115 and optical scanner 102 in system 100 as illustrated in FIG. 1

System 300 includes an optical source 301 that generates a coherent optical beam 302 with a selected polarization (e.g., s-polarization or p-polarization). As illustrated by section A-A (303), the optical beam 302 has an approximately circular or elliptical cross-section. The optical source 301 directs the optical beam 302 to a polarization beam splitter (PBS) 304 that transmits the selected polarization of the optical beam 302 to a first lens system 305. According to some embodiments, a polarizing wave-plate or a Faraday rotator can be used to alter reflected polarizations from optical window 307. According to some embodiments, optical window 307 includes a wedge glass that is configured to eliminate spatial interference between front and back surface reflections. In some scenarios, optical window 307 can be configured based on a scan speed and/or range of interest. In this fashion, wedge orientation can induce a shift in LO signal on one or more photodetectors, which can be used to compensate for the overlap mismatch between return signal and LO signal due to descanning lag in fast unidirectional scanners such as spinning polygon.

According to some embodiments, a beam splitter (BS) may be used in place of PBS 304. The first lens system 305 is configured to focus the optical beam 302 at a first focal plane 306. Lens system can be a single aspheric lens or a multi-element lens design which includes any combination of spherical and aspherical surfaces.

An optical window 307 has a partially-reflecting surface 308 located at the first focal plane 306. The partially-reflecting surface 308 reflects a portion of the optical beam 302 back toward the first lens system 305 as a local oscillator (LO) signal 309 with an altered polarization. The optical window 307 is substantially perpendicular to the primary optical axis 310 of the first lens system 305, so the return path of the LO signal 309 is substantially the same as the forward path of the optical beam 302. Although not depicted, the back surface of the optical window 307 may include a partially-reflecting surface. Therefore, an additional LO signal may be reflected from the optical beam 302 at the back surface of the optical window 307. In one embodiment, either the LO signal 309 from the front surface or the additional LO signal from the back surface may be used as the LO signal. However, of the two LO signal, one may be in-focus while the other may be out-of-focus resulting in competing LO signals and increased shot noise. Therefore, in some embodiments, the optical window 307 may be a wedge glass such that the LO signal reflected from the back surface of the optical window 307 does not interfere with the front surface reflection (e.g., LO signal 309) or vice versa.

The LO signal 309 is collimated by the first lens system 305 and directed to the PBS 304 where the altered polarization of the LO signal 309 is reflected by the PBS 304 to a second lens system 311. As illustrated by section B-B 312, the LO signal 309 has an approximately circular or elliptical cross-section, the same or similar to section A-A 303. The second lens system 311 focuses the LO signal 309 at a second focal plane 313 that is a conjugate focal plane to the first focal plane 306. A photodetector 314 with a photosensitive surface located at the second focal plane 313 receives the energy of the LO signal 309. Ideally, the LO signal 309 would be focused to a point on the second focal plane 313, but practical limitations on the alignment of the optical components could result in a measure of defocusing as illustrated by the projection 316 of the LO signal 309 onto the surface of the detector 315, which has a non-zero diameter. Additional optical components of system 300, including a third lens system 317 and an optical scanner 318 are described below.

Figure 4:
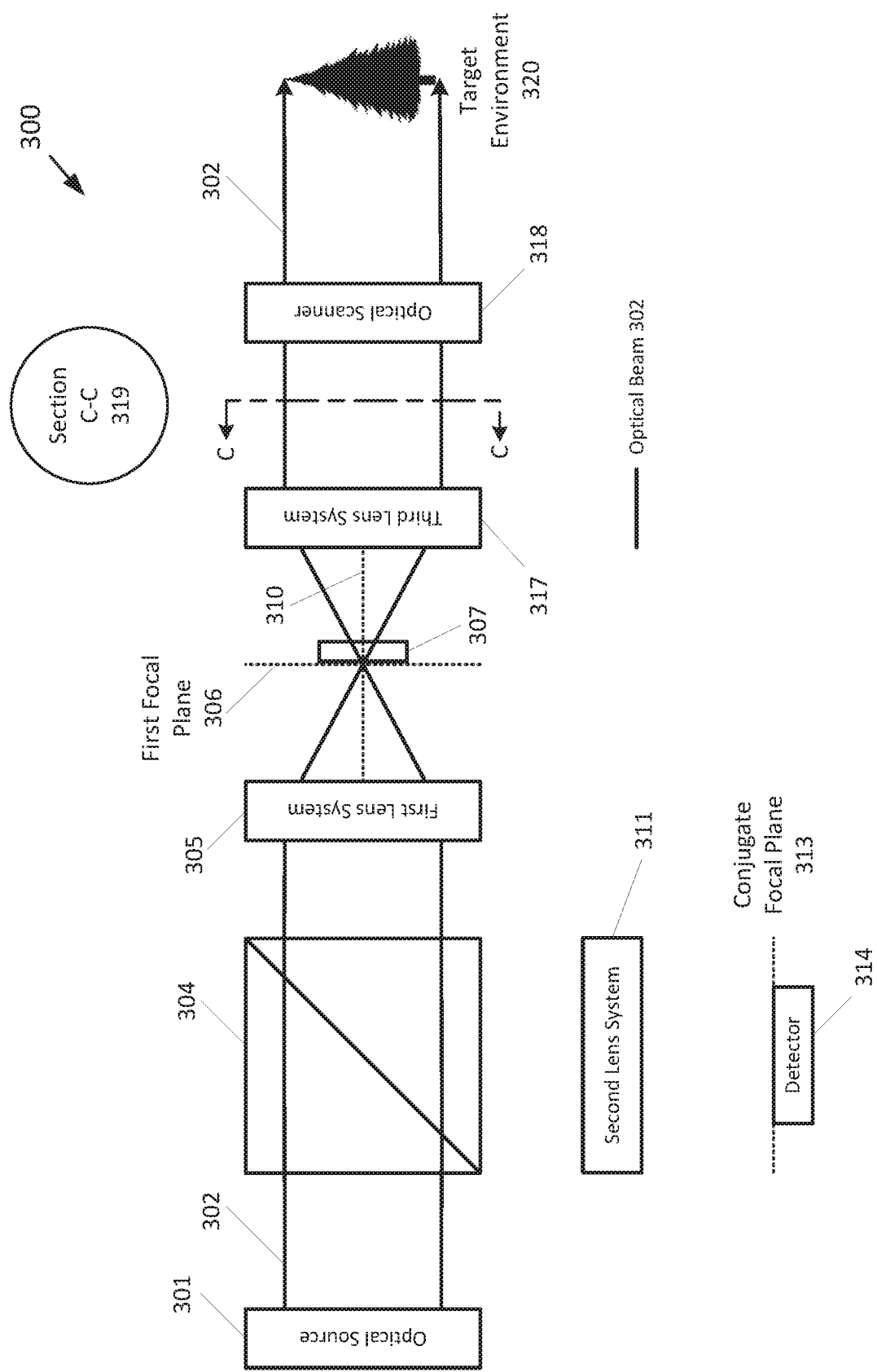
FIG. 4 is a block diagram of an example optical system according to embodiments of the present disclosure.

FIG. 4 illustrates the full path of the optical beam 302 to a target environment 320, in isolation, according to some embodiments. After converging at the first focal plane 306, the portion of the optical beam 302 not reflected from the optical window 307 diverges toward the third lens system 317. In one example, the third lens system 317 has the same focal length as the first lens system 305, so that the optical beam 302 is collimated by the third lens system 317. As illustrated by section C-C 319 in FIG. 4, the collimated optical beam 302 has an approximately circular cross-section.

Figure 5:
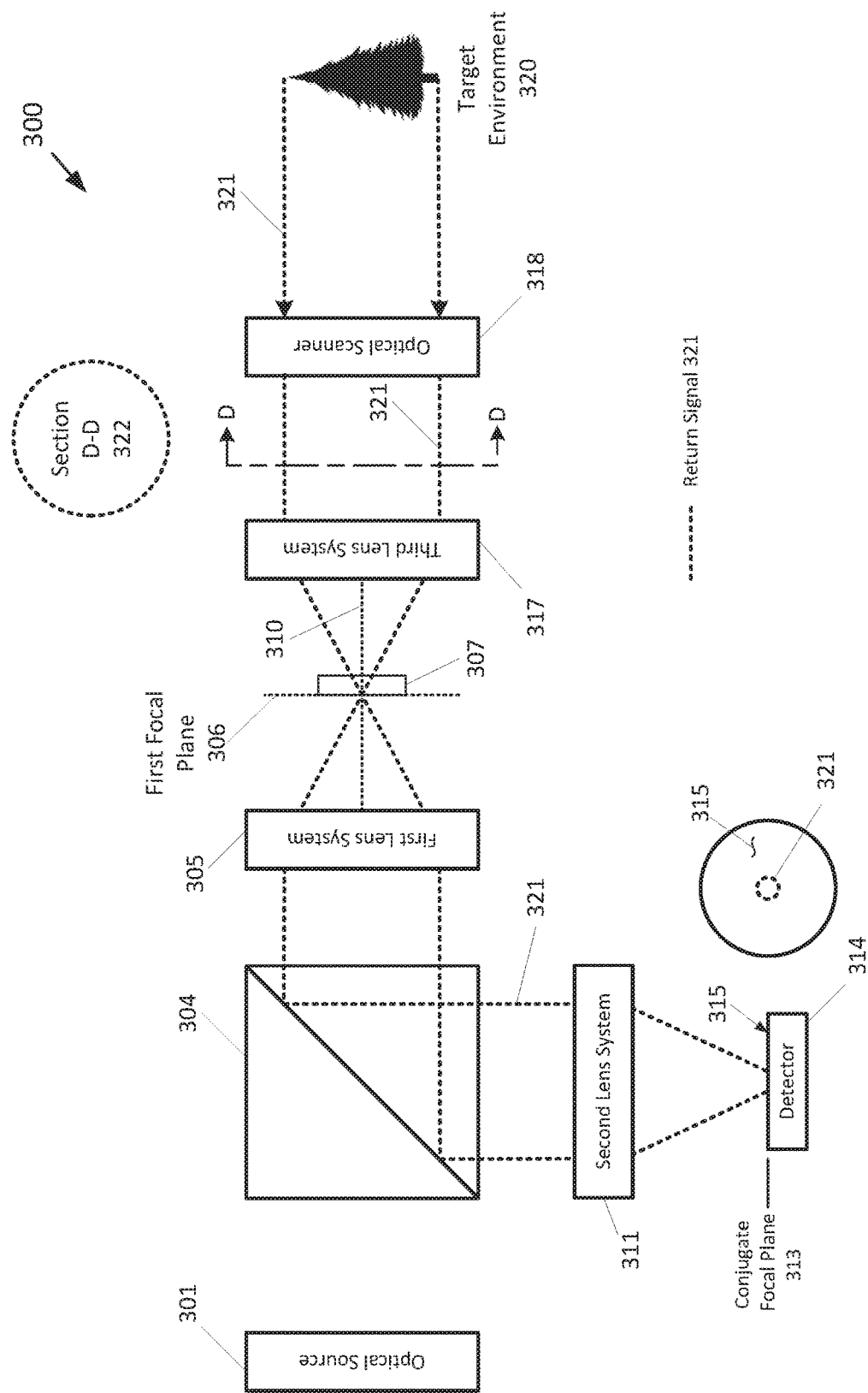
FIG. 5 is a block diagram of an example optical system according to embodiments of the present disclosure.

The collimated optical beam 302 is received by the optical scanner 318, which scans the target environment 320 in azimuth and elevation directions. Objects in the target environment 320 reflect a portion of the optical beam 302 as a return signal as illustrated in FIG. 5. In FIG. 5, a return signal 321, with an altered polarization from the optical beam 302, is de-scanned by the optical scanner 318. Ignoring any effects from de-scanning errors in the optical scanner 318 (described in more detail below), the de-scanned return signal 321 is a collimated beam with an approximately circular cross-section as illustrated by section D-D 322 in FIG. 5, which is substantially parallel to the principal optical axis 310 of the third lens system 317 and the first lens system 305. Accordingly, the return signal 321 converges at the first focal plane 306 and then diverges toward the first lens system 305, where it is re-collimated. The re-collimated return signal 321 is reflected by the PBS 304, due to its altered polarization, and directed toward the second lens system 311.

The second lens system 311 focuses the return signal 321 at the second focal plane 313, as described above with respect to the LO signal 309. According to some embodiments, the return signal 321 can be focused to a point on the second focal plane 313.

Figure 6:
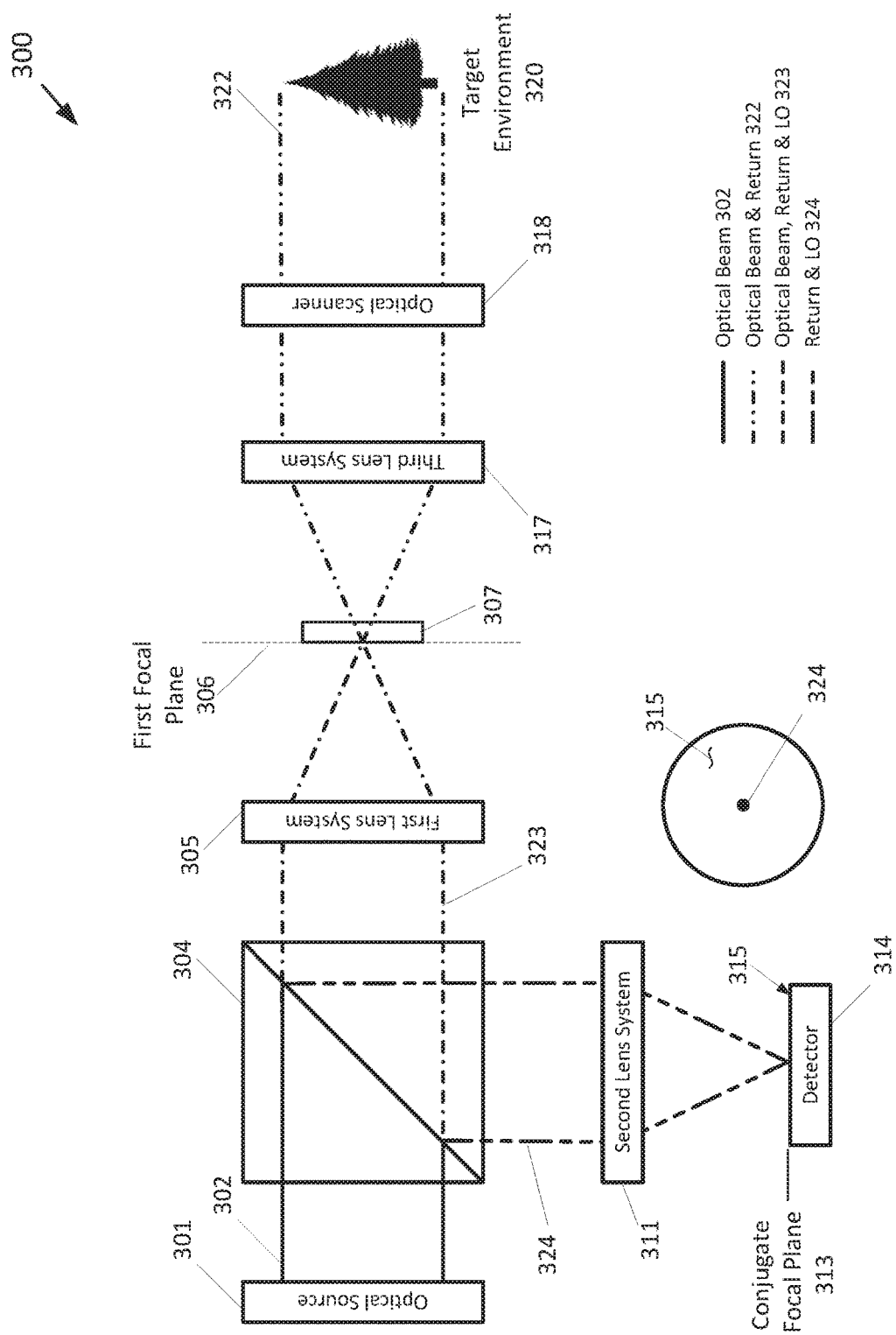
FIG. 6 is a block diagram of an example optical system according to embodiments of the present disclosure.

FIG. 6 illustrates the operation of system 300 when all of the optical components are aligned in a manner that minimizes the optical aberrations. In one example, the optical beam, LO signal and return signal (e.g., optical beam 302, LO signal 309, and return signal 321 of FIGS. 3 and 4) would all be symmetrically aligned. This alignment is illustrated in FIG. 6 through the use of compound beam notation. For example, the beam 322 between the first focal plane 306 and the target environment 320 includes both the outgoing optical beam 302 and the incoming return signal 321; the beam 323 between the first focal point 306 and the PBS 304 includes the outgoing optical beam 302, the incoming return signal (e.g., return signal 321 as depicted in FIG. 5), and the LO signal (e.g., LO signal 309 of FIG. 3); and the beam 324 between the PBS 304 and the photodetector 314 includes both the LO signal (e.g., LO signal 309 of FIG. 3) and the return signal (e.g., return signal 321 of FIG. 5). In this example of system 300, the LO signal and return signal (e.g., LO signal 309 and the return signal 321 of FIGS. 3 and 5) would be focused at a point on the second focal plane 313.

Figure 7:
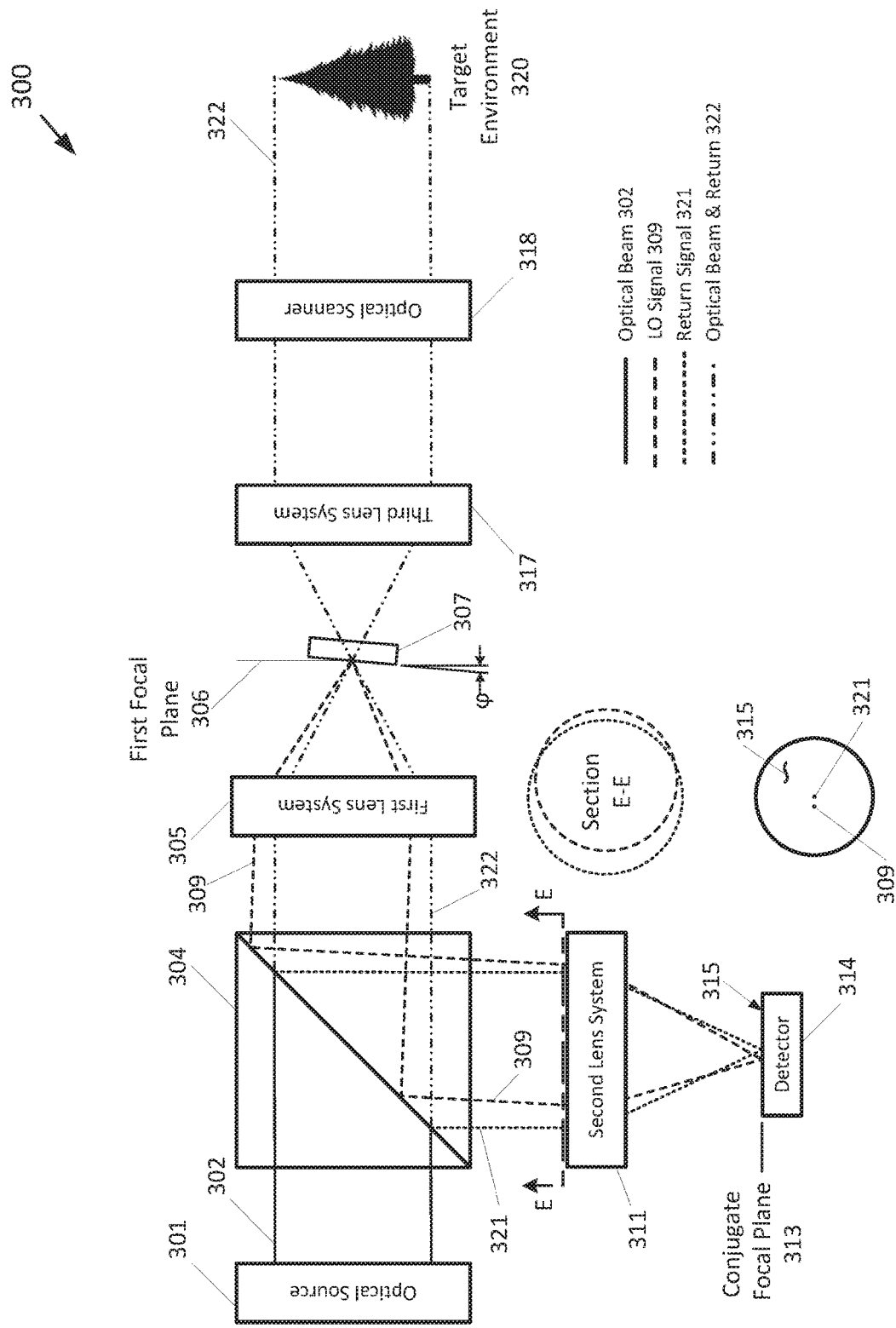
FIG. 7 is a block diagram of an example optical system according to embodiments of the present disclosure.

FIG. 7 illustrates a system where the optical window 307 has been misaligned by the angle ϕ. A misalignment may cause the point focus of the LO signal 309 to diverge from the point focus of the return signal 321 on the second focal plane 313. The spatial mixing efficiency (γ) of the system 300 is a function of the overlap integral of the spot size of the LO signal 309 and the spot size of the return signal 321, given by:

$$\gamma \propto \frac{\left| \int\int_{-det}^{det} E_{LO}(x,y) * E_s(x-x_0, y-y_0) dx dy \right|^2}{\int\int_{-det}^{det} |E_{LO}(x,y)|^2 \cdot \int\int_{-det}^{det} |E_s(x-x_0, y-y_0)|^2}$$

where $E_s$ and $E_{lo}$ are the return signal and LO signal electric field profiles on the photodetector, $x_0$ and $y_0$ are the displacement of the return signal spot relative to the LO signal spot, and det is the radius of detector 314 for a circular detector. If the LO signal spot and the return signal spot do not overlap, as illustrated in FIG. 7, the spatial mixing efficiency will be reduced to zero.

Figure 8:
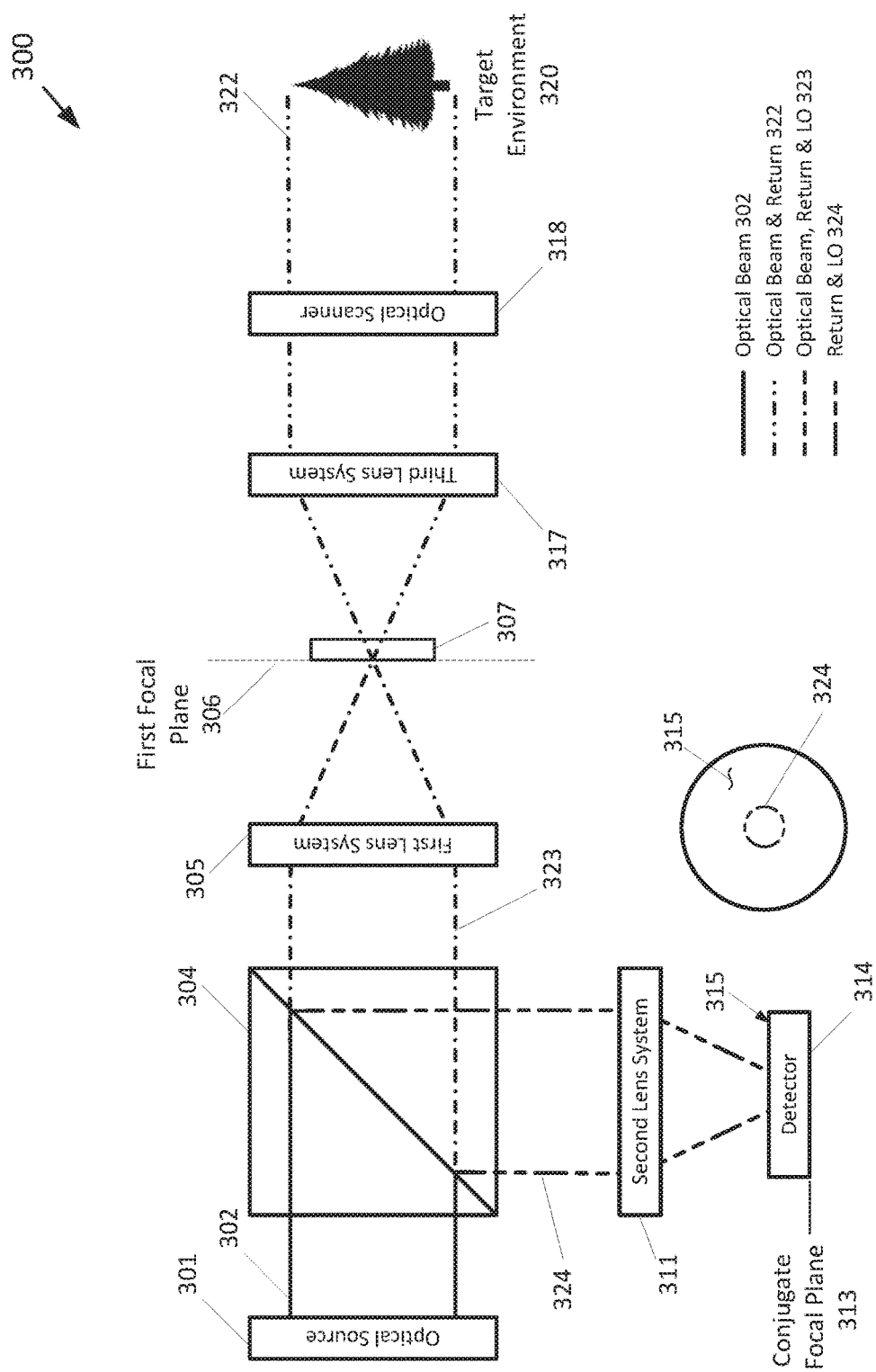
FIG. 8 is a block diagram of an example optical system according to embodiments of the present disclosure.

Mixing efficiency can be maximized, even if a misalignment of the optical window 307 occurs, by locating the surface 315 of the photodetector 314 in front of the second focal plane 313 (or behind the second focal plane 313 to achieve a similar de-focusing effect) as illustrated in FIG. 8, where the projection of the compound beam 324 on the surface 315 of the photodetector 314 (which includes the coaxial LO signal 309 and return signal 321) has an increased diameter compared with the spot focus of the compound beam 324 in the configuration of FIG. 6.

Figure 9:
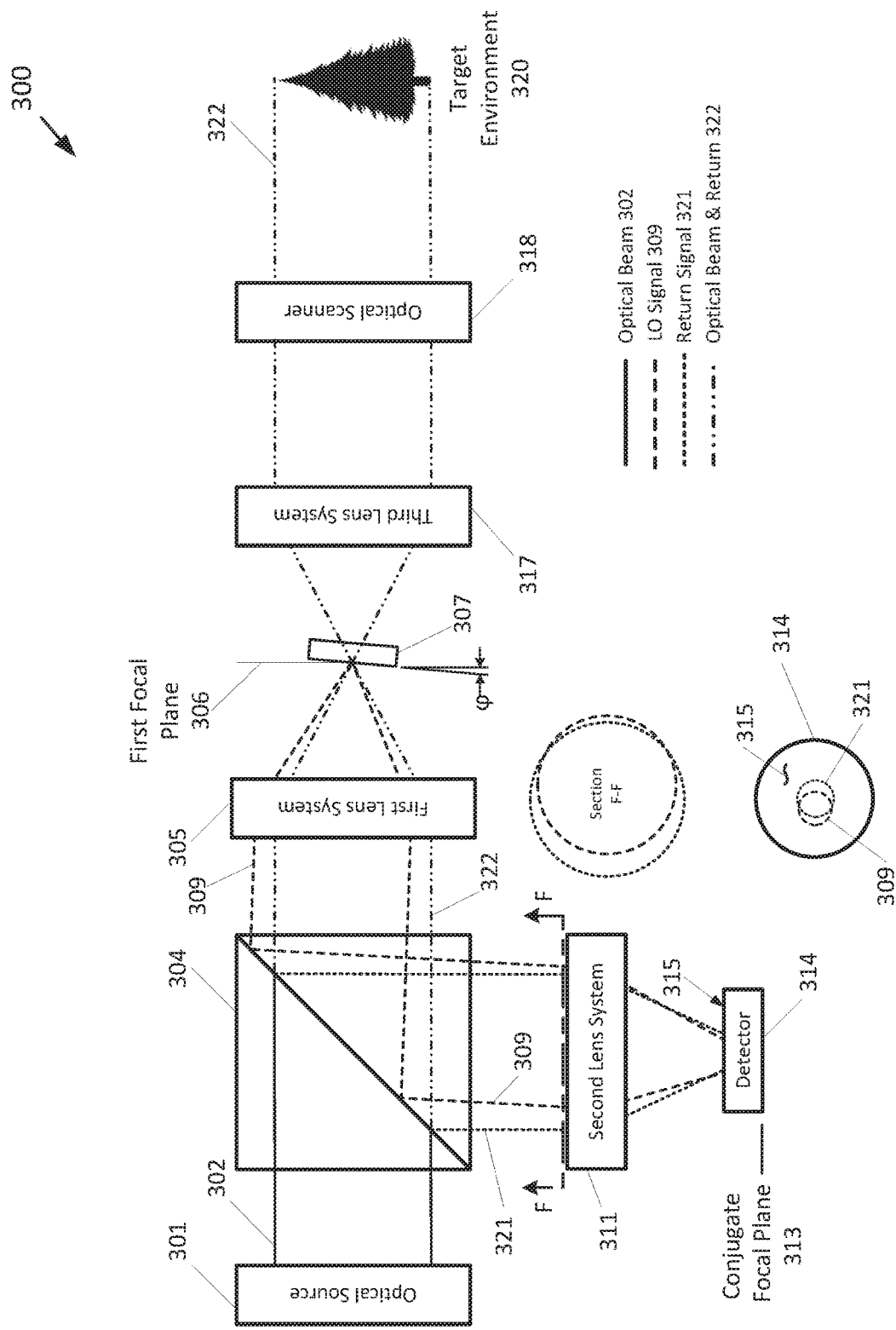
FIG. 9 is a block diagram of an example optical system according to embodiments of the present disclosure.

FIG. 9 illustrates the effect of repositioning the photodetector 314 in front of the second focal plane 313 where the LO signal 309 and the return signal 321 are misaligned. Rather than two non-overlapping focal points, the LO signal 309 and the return signal 321 have overlapping areas on the face 315 of the photodetector 314, where spatial mixing can occur to generate the baseband signal $\Delta f_R(t)$.

Positioning the photodetector 314 in front of the second focal plane 313 may also increase the spatial mixing to combat misalignment between the LO signal 309 and the return signal 321 due to de-scanning lag of return signal 321 in the optical scanner 318 caused by potential. At angular velocities greater than approximately 20,000 degrees per second, the time delay for return signals, from targets at sufficiently long range, is long enough that the scanning mirror in the optical scanner 318 has time to rotate a non-negligible angle, causing a skew in the angle of the return signal 321 that is reflected to the third lens system 317 by the optical scanner 318.

Figure 10:
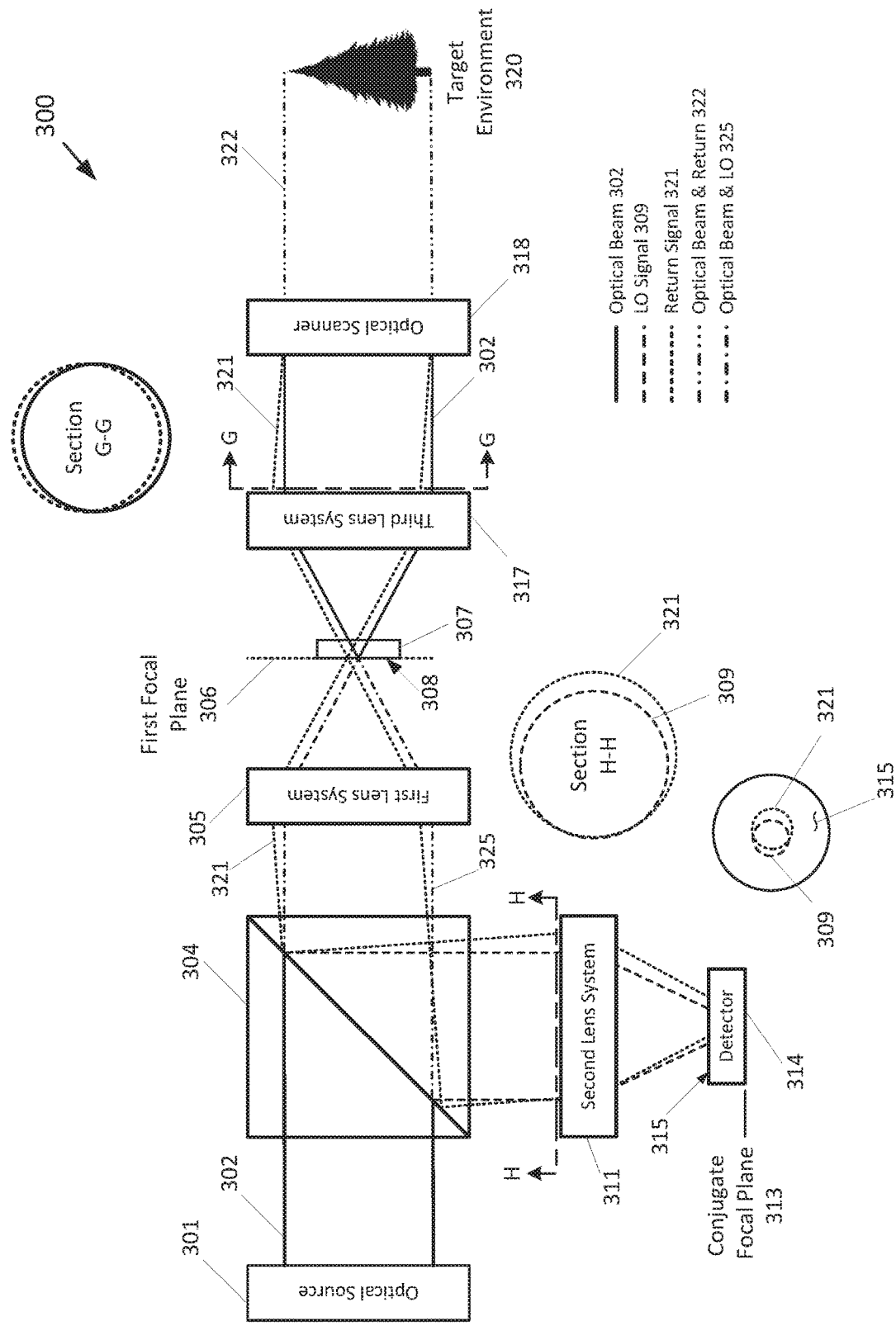
FIG. 10 is a block diagram of an example optical system according to embodiments of the present disclosure.
Figure 11:
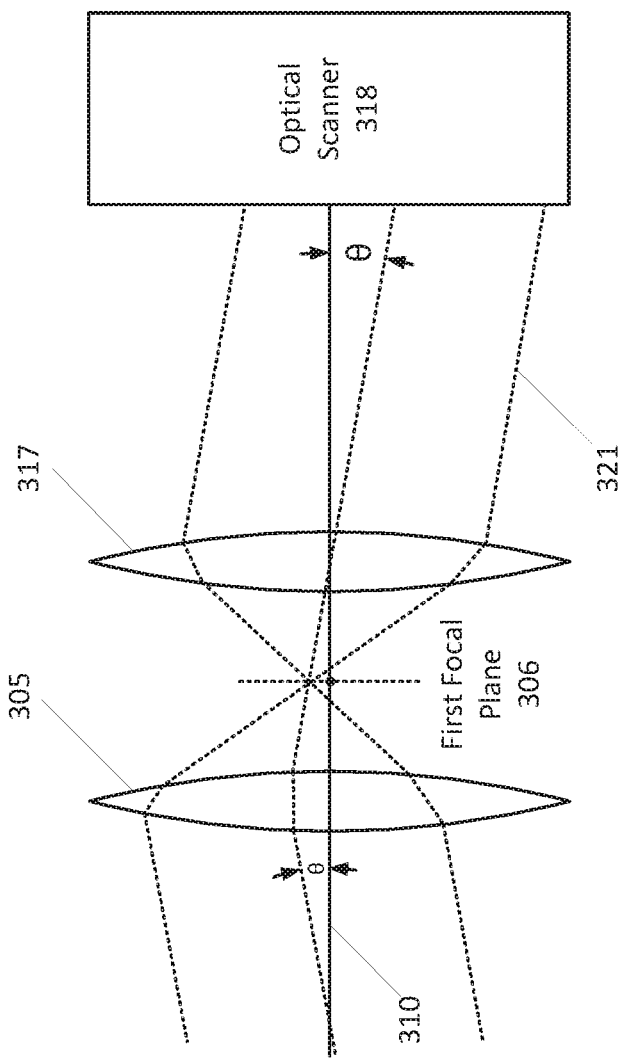
FIG. 11 is an example of a system of lenses according to embodiments of the present disclosure.

This skewing effect is illustrated in the example of FIG. 10, where the return signal 321 is skewed from the optical beam 302 as shown in section G-G. The skew angle is propagated through the combination of the third lens system 317 and the first lens system 305 as illustrated in FIG. 11, where the lens systems are represented by equivalent, thin double-convex lenses. If the return signal 321 enters the third lens system 317 as a plane wave at an angle θ with respect to the principal optical axis 310, then the return signal 321 will converge at the first focal plane 306 at a point determined by the focal length of the third lens system 317 and the angle θ. Additionally, as noted previously, since the distance between first and third lens system is equal to the sum of their focal lengths, the return signal 321 will be re-collimated by the first lens system 305 at the angle θ with respect to the principal optical axis 310.

Returning to FIG. 10, the skewed return signal 321 and the LO signal 309 are reflected by the PBS 304 and directed to the second lens system 311 as overlapping signals as illustrated by section H-H. Both signals are focused at the second focal plane 313, but at different points. The non-skewed LO signal 309 will be focused on the principal optical axis of the second lens system 311, while the skewed return signal 321 will be focused at a point offset from the principal optical axis, just as the third lens system 317 focused the return signal 321 on the first local plane 306. However, since the photodetector 314 is located in front of the second focal plane 313, there is substantial overlap between the LO signal 309 and the return signal 321 on the face 315 of the photodetector 314.

Figure 12:
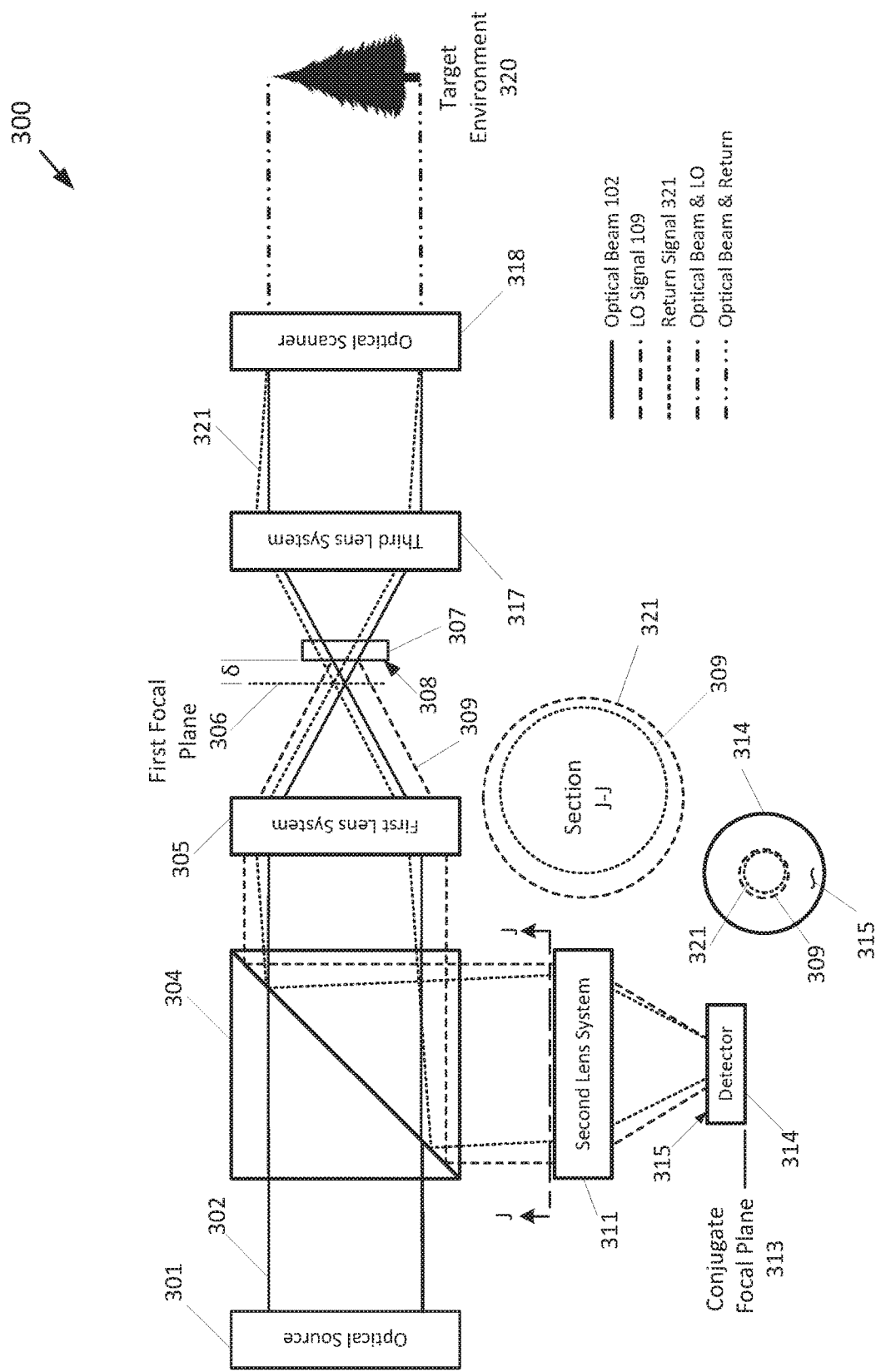
FIG. 12 is a block diagram of an example optical system according to embodiments of the present disclosure.

FIG. 12 illustrates the example system 300 with a modification that generates a complete overlap between the LO signal 309 and the return signal 321 on the surface 315 of the photodetector 314. The modification comprises a displacement of the partially-reflecting surface 308 of the optical window 307 by moving the optical window away from the first focal plane 306 by a distance δ toward the third lens system 317 in the example of FIG. 12. It should be noted that the same effect can be achieved by moving the optical window away from the focal plane 306 in the opposite direction, toward the first lens system 305. This displacement causes the optical beam 302 to be reflected from the partially-reflecting surface 308 after it has diverged from its focal point. As a result, the LO signal 309 reflected from the partially-reflecting surface 308 has a substantially greater diameter than it would have if reflected at the focal plane 306, as illustrated by section J-J.

As illustrated in FIG. 12, the second lens system 311 focuses the LO signal 309 and the return signal 321 toward the second focal plane 313. The location of the photodetector 314 and the increased diameter of the LO signal 309 result in a complete overlap of the LO signal 309 and the return signal 321 to maximize the spatial mixing efficiency.

Figure 13:
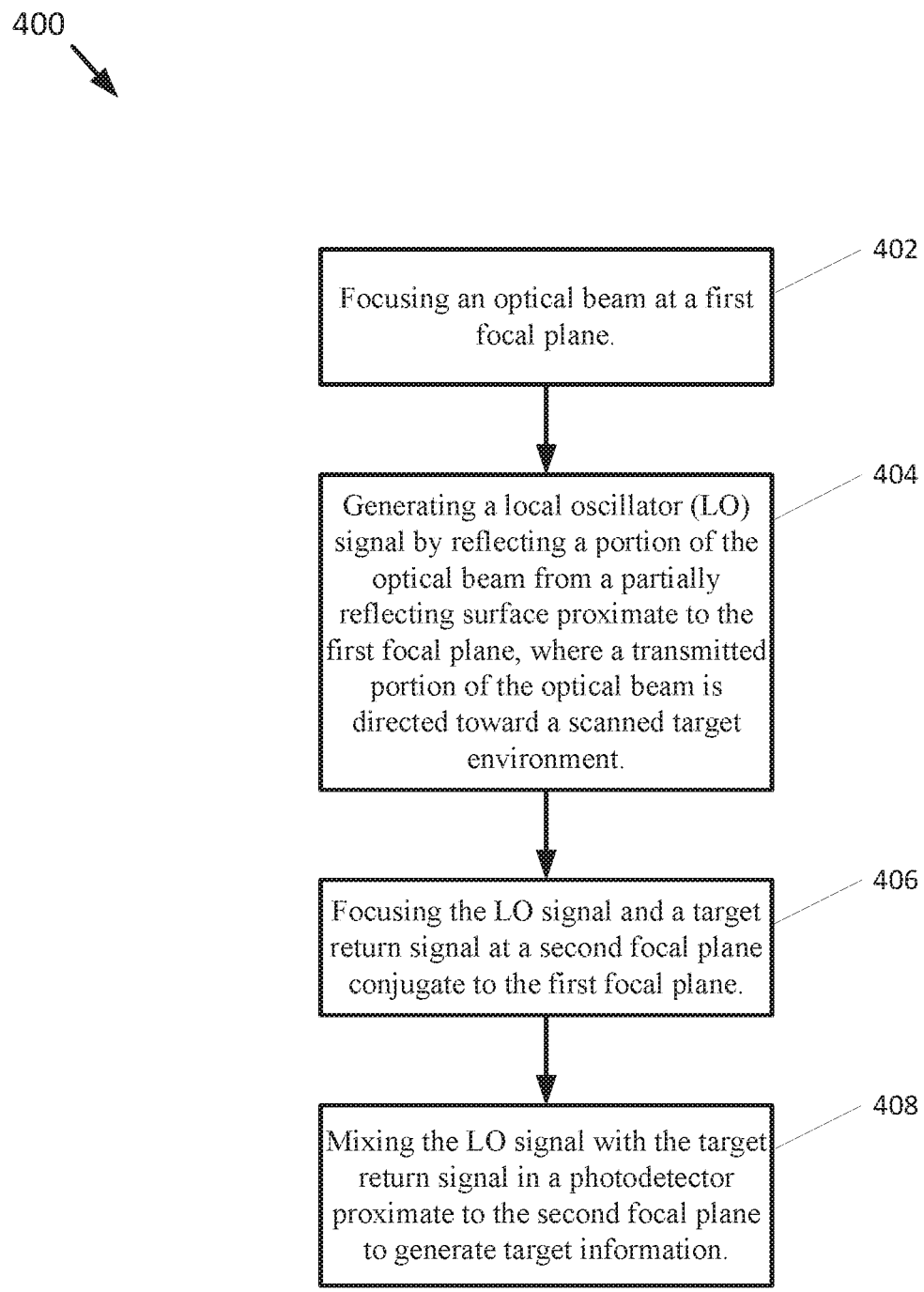
FIG. 13 is a flowchart illustrating an example method for generating a coaxial local oscillator at a conjugate focal plane according to embodiments of the present disclosure.

FIG. 13 is a flowchart illustrating an example method 400 in a LIDAR system for generating a coaxial local oscillator signal at a conjugate focal plane according to embodiments of the present disclosure. Method 400 begins at operation 402, focusing an optical beam (e.g., optical beam 302) at a first focal plane (e.g., focal plane 306). Method 400 continues at operation 404, generating a local oscillator (LO) signal (e.g., LO signal 309) by reflecting a portion of the optical beam from a partially reflecting surface (e.g., surface 308 on optical window 307) proximate to the first focal plane, where a transmitted portion of the optical beam is directed toward a scanned target environment (e.g., by optical scanner 318). Next, method 400 continues at operation 406, focusing the LO signal and a target return signal (e.g., return signal 321) at a second focal plane (e.g., second focal plane 313) conjugate to the first focal plane. Method 400 concludes with operation 408, mixing the LO signal with the target return signal in a photodetector (e.g., photodetector 314) proximate to the second focal plane to generate target information.

Figure 14:
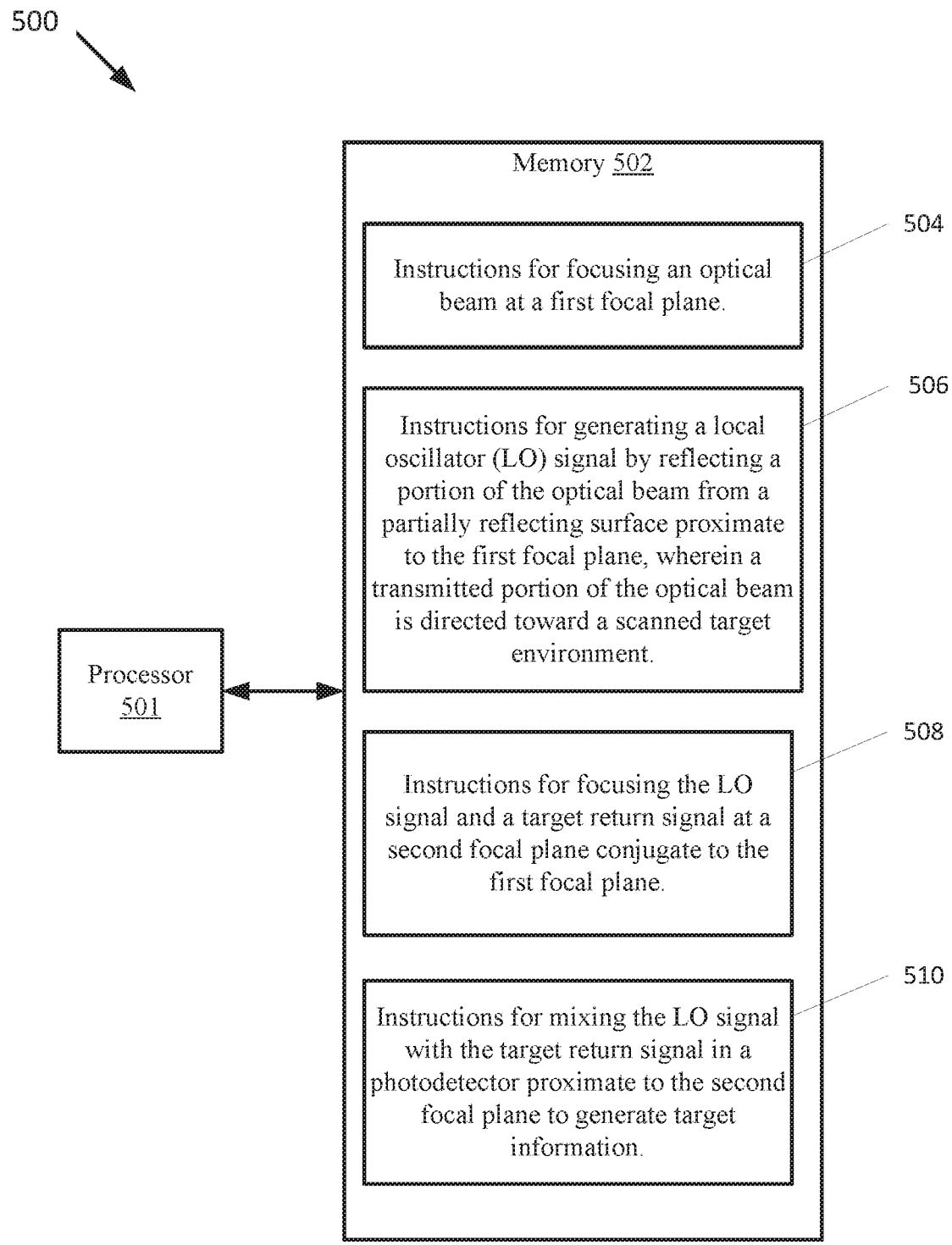
FIG. 14 is a block diagram of an example system for generating a coaxial local oscillator at a conjugate focal plane according to embodiments of the present disclosure.

FIG. 14 is a block diagram illustrating an example processing system 500 in a LIDAR system for generating a coaxial local oscillator signal at a conjugate focal plane according to embodiments of the present disclosure. Processing system 500 includes a processor 501. In one example, processor 501 may be embedded in the signal processing unit 112 in the LIDAR control systems 110 in LIDAR system 100. In some examples, 501 may be one or more general-purpose processing devices such as a microprocessor, central processing unit, or the like. More particularly, processor 501 may be a complex instruction set computing (CISC) microprocessor, reduced instruction set computer (RISC) microprocessor, very long instruction word (VLIW) microprocessor, or processor implementing other instruction sets, or processors implementing a combination of instruction sets. The processor 501 may also be one or more special-purpose processing devices such as an application specific integrated circuit (ASIC), a field programmable gate array (FPGA), a digital signal processor (DSP), network processor, or the like.

Processing system 500 also includes a computer-readable memory 502 coupled to the processor 501. Memory 502 may be, for example, read-only memory (ROM), random-access memory (RAM, programmable read-only memory (PROM), erasable programmable read-only memory (EPROM), electrically erasable programmable read-only memory (EEPROM), flash memory, magnetic disk memory such hard disk drives (HDD), optical disk memory such as compact-disk read-only memory (CD-ROM) and compact disk read-write memory (CD-RW), or any other type of non-transitory memory.

In some examples, memory 502 includes instructions that, when executed by the processor 501, cause a LIDAR system (e.g., LIDAR system 100) to generate a coaxial local oscillator signal (e.g., LO signal 309) at a conjugate focal plane (e.g., second focal plane 313) according to embodiments of the present disclosure.

In one example, memory 502 includes instructions 504 for focusing an optical beam (e.g., optical beam 302) at a first focal plane (e.g., focal plane 306); instructions 506 for generating a local oscillator (LO) signal (e.g., LO signal 309) by reflecting a portion of the optical beam from a partially reflecting surface (e.g., surface 308 of optical window 307) proximate to the first focal plane, where a transmitted portion of the optical beam is directed toward a scanned target environment (e.g., by optical scanner 318); instructions 508 for focusing the LO signal and a target return signal (e.g., return signal 321) at a second focal plane conjugate to the first focal plane (e.g., second focal plane 313); and instructions 510 for mixing the LO signal with the target return signal in a photodetector (e.g., photodetector 314) proximate to the second focal plane to generate target information.

Figure 15:
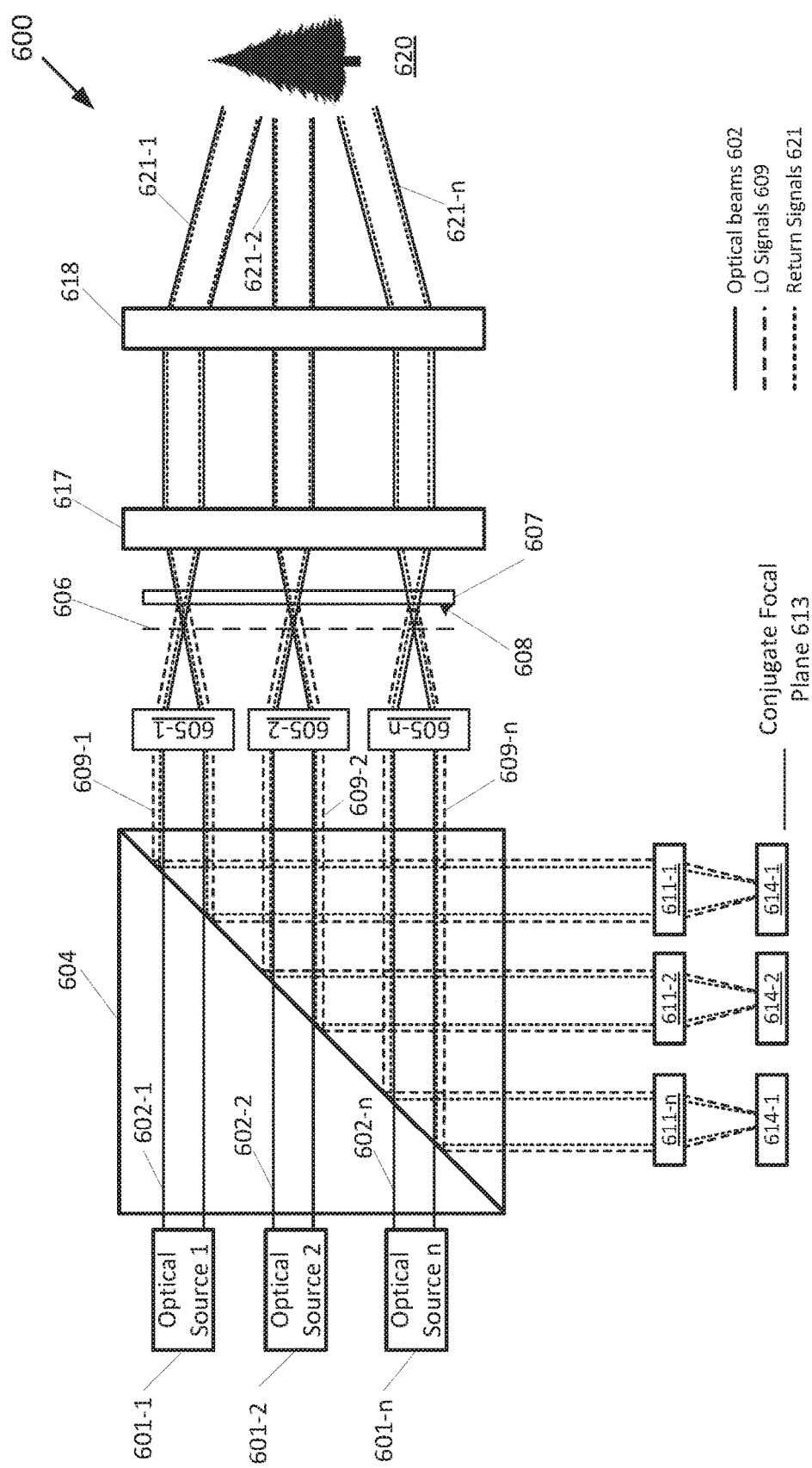
FIG. 15 is a block diagram of an example multi-beam optical system according to embodiments of the present disclosure.

FIG. 15 is a block diagram of an example multi-beam LIDAR system 600 for generating coaxial local oscillator signals at a conjugate plane according to embodiments of the present disclosure. System 600 is functionally similar to system 300, which has already been described in detail, except that system 600 includes multiple FMCW optical sources 601-1 through 601-$n$, where each optical source may operate at a different frequency and/or bandwidth and emit a corresponding optical beams 602-1 through 602-$n$ (collectively, optical beams 602). Each of the optical beams 602 is passed by a polarization beam splitter (PBS) 604 to a corresponding first lens system 605-1 through 605-$n$ (collectively, first lens systems 605). Each first lens system 605 focuses its corresponding optical beam 602 to a focal point on a first focal plane 606. The optical beams 602 then diverge beyond the first focal plane 606, where they are partially reflected by a partially-reflecting surface 608 on an optical window 607. The reflected portion of each optical beam 602 comprises a corresponding local oscillator (LO) signal 609-1 through 609-$n$ (collectively, LO signals 609).

The LO signals 609 are each collimated by their respective first lens system 605 and then reflected by PBS 604 toward corresponding second lens system 611-1 through 611-$n$ (collectively, second lens systems 611). Each second lens system 611 focuses its corresponding LO signal 609 to a focal point on a second focal plane 613 that is conjugate to the first focal plane 606. Each LO signal 609 is intercepted by a corresponding photodetector 611-1 through 611-$n$ (collectively, photodetectors 611) such that each photodetector 611 is illuminated by a corresponding LO signal 609 with a non-zero diameter.

The portion of each optical beam 602 that is not reflected from optical window 606 is collimated by a third lens system 618 and transmitted to an optical scanner 618. Optical scanner 618 scans a target environment 620 with the optical beams 602, and de-scans corresponding target return signals 621-1 through 621-$n$ (collectively, return signals 621). The return signals 621 are focused by third lens system 617 at the first focal plane 606 and then diverge to intercept the corresponding first lens system 605. Each first lens system 605 collimates its corresponding return signal 621, which are then reflected by PBS 604 toward second lens systems 611. Each second lens system 611 focuses its corresponding return signal 621 on the second focal plane 613. The return signals 621 illuminate their corresponding photodetector 614, where they overlap and spatially mix with a corresponding LO signal 609.

Figure 16:
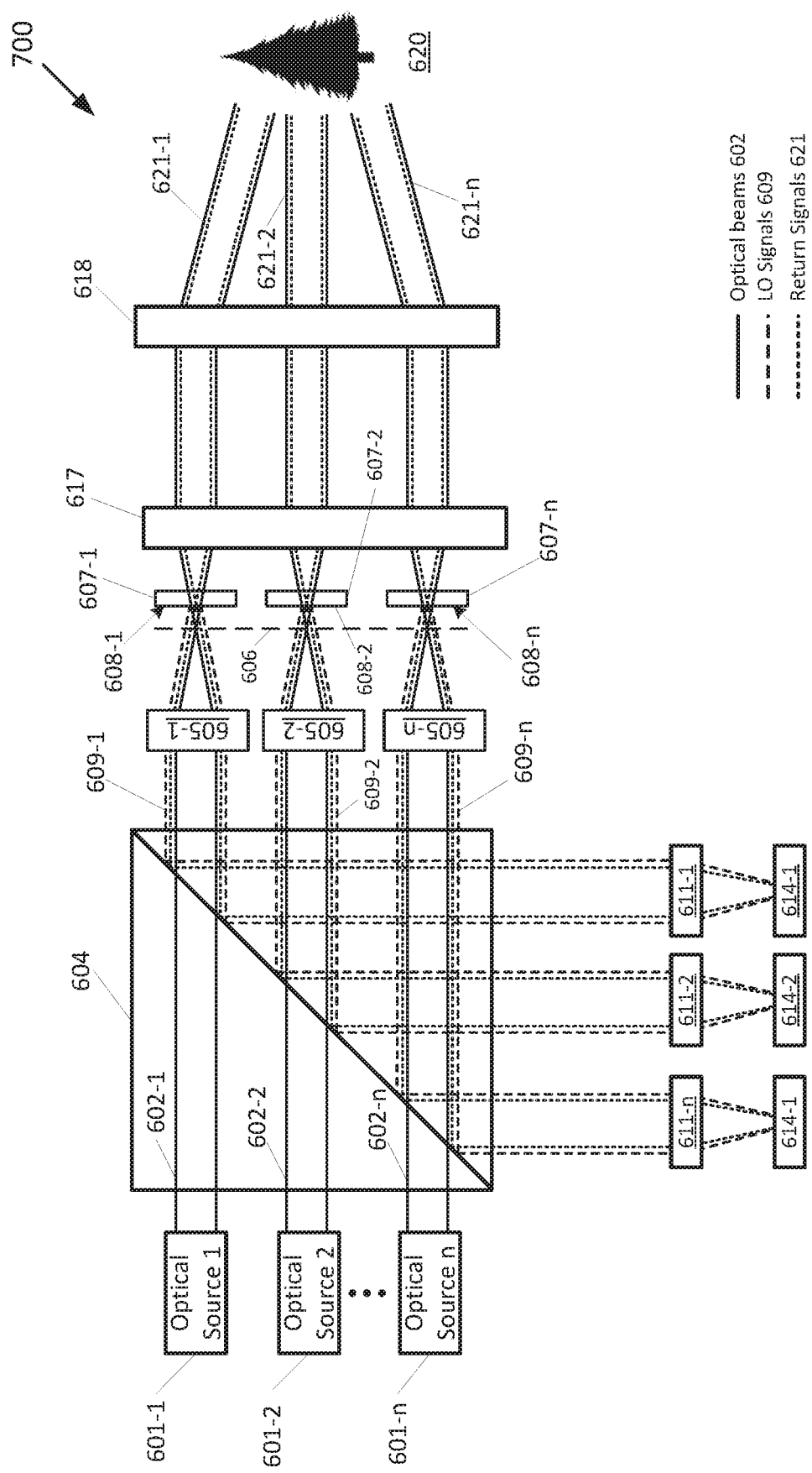
FIG. 16 is a block diagram of an example multi-beam optical system according to embodiments of the present disclosure.

FIG. 16 is a block diagram of an example multi-beam LIDAR system 700 for generating coaxial local oscillator signals at a conjugate plane according to embodiments of the present disclosure. System 700 is similar in all respects to system 600, except that system 700 includes independent optical windows 607-1 through 607-n, which can be adjusted independently with respect to their offset from the first focal plane 606.

Figure 17:
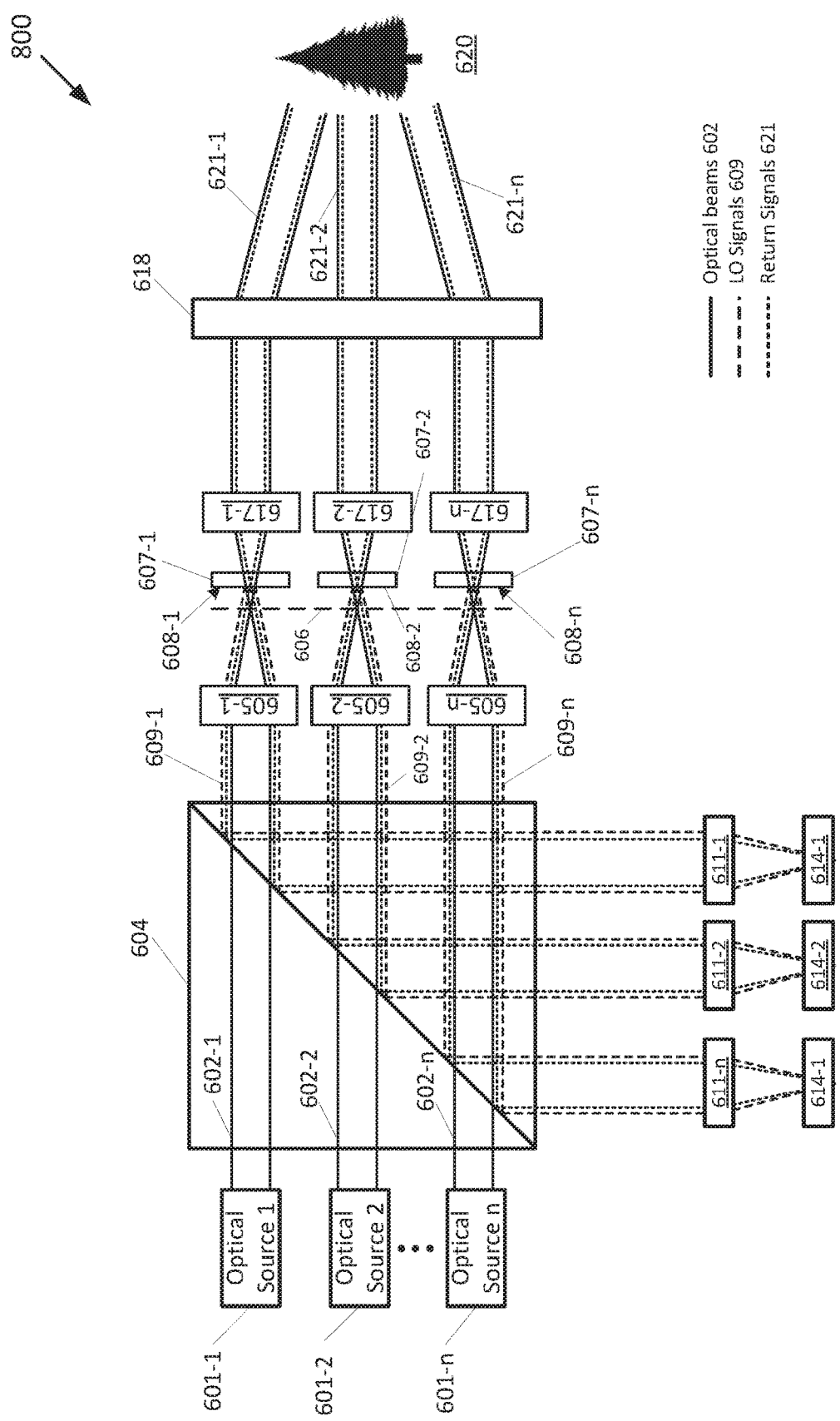
FIG. 17 is a block diagram of an example multi-beam optical system according to embodiments of the present disclosure.

FIG. 17 is a block diagram of an example multi-beam LIDAR system 800 for generating coaxial local oscillator signals at a conjugate plane according to embodiments of the present disclosure. System 800 is similar in all respects to system 700, except that system 800 includes independent third lens systems 617-1 through 617-n.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operation may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A light detection and ranging (LIDAR) system, comprising:
   an optical source to emit an optical beam; and
   free-space optics coupled with the optical source to focus the optical beam at a first focal plane, wherein a local oscillator (LO) signal is generated from a partial reflection of the optical beam from a partially reflecting surface proximate to the first focal plane, wherein a transmitted portion of the optical beam is directed toward a scanned target environment, the free-space optics further to focus the LO signal and a target return signal at a second focal plane comprising a conjugate focal plane to the first focal plane, wherein the free-space optics further comprise:
      a polarization beam splitter (PBS) to transmit the optical beam to a first lens system, the first lens system to focus the optical beam at the first focal plane;
      an optical window comprising the partially reflecting surface, wherein the LO signal is generated from the optical beam and reflected back through the first lens system; and
      a photodetector comprising a photosensitive surface proximate to the conjugate focal plane to mix the LO signal with the target return signal to generate target information.

2. The system of claim 1, wherein the free-space optics further comprise a second lens system, wherein the LO signal is directed through the second lens system by the PBS, the second lens system to focus the LO signal and the target return signal at the second focal plane.

3. The system of claim 2, wherein the free-space optics further comprise:
   a third lens system to collimate the transmitted portion of the optical beam; and
   an optical scanner coupled with the third lens system to scan the target environment with the transmitted portion of the optical beam, and to de-scan the target return signal, the third lens system to focus the target return signal at the first focal plane, the first lens system to collimate the LO signal and the target return signal, and the PBS to direct the LO signal and the target return signal to the second lens system.

4. The system of claim 1, wherein the partially reflecting surface is displaced from the first focal plane.

5. The system of claim 1, wherein the photodetector is displaced from the second focal plane.

6. A method in a light detection and ranging (LIDAR) system, comprising:
   generating an optical beam with a coherent optical source;
   transmitting the optical beam through a polarization beam splitter (PBS) and through a first lens system to focus the optical beam at a first focal plane and through an optical window comprising a partially reflecting surface;
   focusing the optical beam at the first focal plane;
   generating a local oscillator (LO) signal by reflecting a portion of the optical beam from the partially reflecting surface proximate to the first focal plane, wherein a transmitted portion of the optical beam is directed toward a scanned target environment, wherein the LO signal is reflected back through the first lens system;

focusing the LO signal and a target return signal at a second focal plane conjugate to the first focal plane; and mixing the LO signal with the target return signal in a photodetector proximate to the second focal plane to generate target information.

7. The method of claim 6, further comprising reflecting the LO signal and the target return signal from the PBS through a second lens system, wherein the LO signal and the target return signal are focused at the second focal plane.

8. The method of claim 7, further comprising:
collimating the transmitted portion of the optical beam with a third lens system;
scanning the target environment with the transmitted portion of the optical beam;
de-scanning the target return signal; and
focusing the target return signal at the first focal plane with the third lens system.

9. The method of claim 8, further comprising:
collimating the LO signal and the target return signal with the first lens system; and
directing the LO signal and the target return signal to the second lens system with the PBS, wherein the LO signal and the target return signal are focused at the second focal plane.

10. The method of claim 6, wherein the partially reflecting surface is displaced from the first focal plane.

11. The method of claim 6, wherein the photodetector is displaced from the second focal plane.

12. A light detection and ranging (LIDAR) system, comprising:
a processor; and
a non-transitory computer-readable medium storing instructions, that when executed by the processor, cause the LIDAR system to:
focus an optical beam at a first focal plane;
generate the optical beam with a coherent optical source;
transmit the optical beam through a polarization beam splitter (PBS) and through a first lens system to focus the optical beam at the first focal plane and through an optical window comprising a partially reflecting surface;
generate a local oscillator (LO) signal by reflecting a portion of the optical beam from the partially reflecting surface proximate to the first focal plane, wherein a transmitted portion of the optical beam is directed toward a scanned target environment, wherein the LO signal is reflected back through the first lens system;
focus the LO signal and a target return signal at a second focal plane conjugate to the first focal plane; and
mix the LO signal with the target return signal in a photodetector proximate to the second focal plane to generate target information.

13. The system of claim 12, the LIDAR system further to reflect the LO signal and the target return signal from the PBS through a second lens system, wherein the LO signal and the target return signal are focused at the second focal plane.

14. The system of claim 13, the LIDAR system further to:
collimate the transmitted portion of the optical beam with a third lens system;
scan the target environment with the transmitted portion of the optical beam;
de-scan the target return signal; and
focus the target return signal at the first focal plane with the third lens system.

15. The system of claim 14, the LIDAR system to:
collimate the LO signal and the target return signal with the first lens system; and
direct the LO signal and the target return signal to the second lens system with the PBS, wherein the LO signal and the target return signal are focused at the second focal plane.

16. The system of claim 12, wherein the partially reflecting surface is displaced from the first focal plane.

17. The system of claim 12, wherein the photodetector is displaced from the second focal plane.

* * * * *